United States Patent [19]

de Winter

[11] 4,252,850

[45] Feb. 24, 1981

[54] COVER WITH REINFORCED EDGE

[75] Inventor: Jan G. de Winter, Enschede, Netherlands

[73] Assignee: Nicolon B.V., Enschede, Netherlands

[21] Appl. No.: 938,328

[22] Filed: Aug. 30, 1978

[30] Foreign Application Priority Data

Sep. 1, 1977 [NL] Netherlands .................. 7709644

[51] Int. Cl.³ .............................................. B32B 3/10
[52] U.S. Cl. ........................................ 428/131; 52/3; 428/134; 428/137; 428/193
[58] Field of Search ............... 428/131, 132, 133, 134, 428/137, 255, 193; 52/3, 4, 5; 150/52 R; 135/5 R, 5 A, 5 B, 5 C, 5 D, 5 E

[56] References Cited

U.S. PATENT DOCUMENTS

| 647,186 | 4/1900 | Knapp | 428/131 X |
| 741,808 | 10/1903 | Miner | 428/131 X |
| 1,837,775 | 12/1931 | Howard | 428/131 X |
| 3,214,320 | 10/1965 | Lappala et al. | 428/255 X |
| 3,301,738 | 1/1967 | Lappala et al. | 428/131 X |
| 3,419,025 | 12/1968 | Kearns | 135/5 R |
| 3,650,881 | 3/1972 | Giannone, Sr. | 428/133 |
| 3,758,371 | 9/1973 | Lang et al. | 428/137 |
| 3,987,592 | 10/1976 | Herminghaus et al. | 135/5 R X |
| 4,107,051 | 8/1978 | Lorentzen | 428/136 X |

Primary Examiner—Henry F. Epstein
Attorney, Agent, or Firm—LeBlanc, Nolan, Shur & Nies

[57] ABSTRACT

A cover or the like consisting at least of one woven plastic web, provided at least on one side with a plastics foil, and for covers of comparatively large width composed of a number of such webs in either butted or slightly overlapping relationship. For reinforcement purposes, there is applied at least at two opposite sides an edge strip of similar, at least equally strong material as the cover. Spaced apart from the respective lateral edges, there are formed attachment holes, whereby a reinforcement cord in the longitudinal central region of the respective strip, substantially parallel to the respective lateral edge of the cover, is embedded between the edge strip and cover, while the said attachment holes are formed in the region inwardly adjoining the said reinforcement cord, through the edge strip and cover.

3 Claims, 2 Drawing Figures

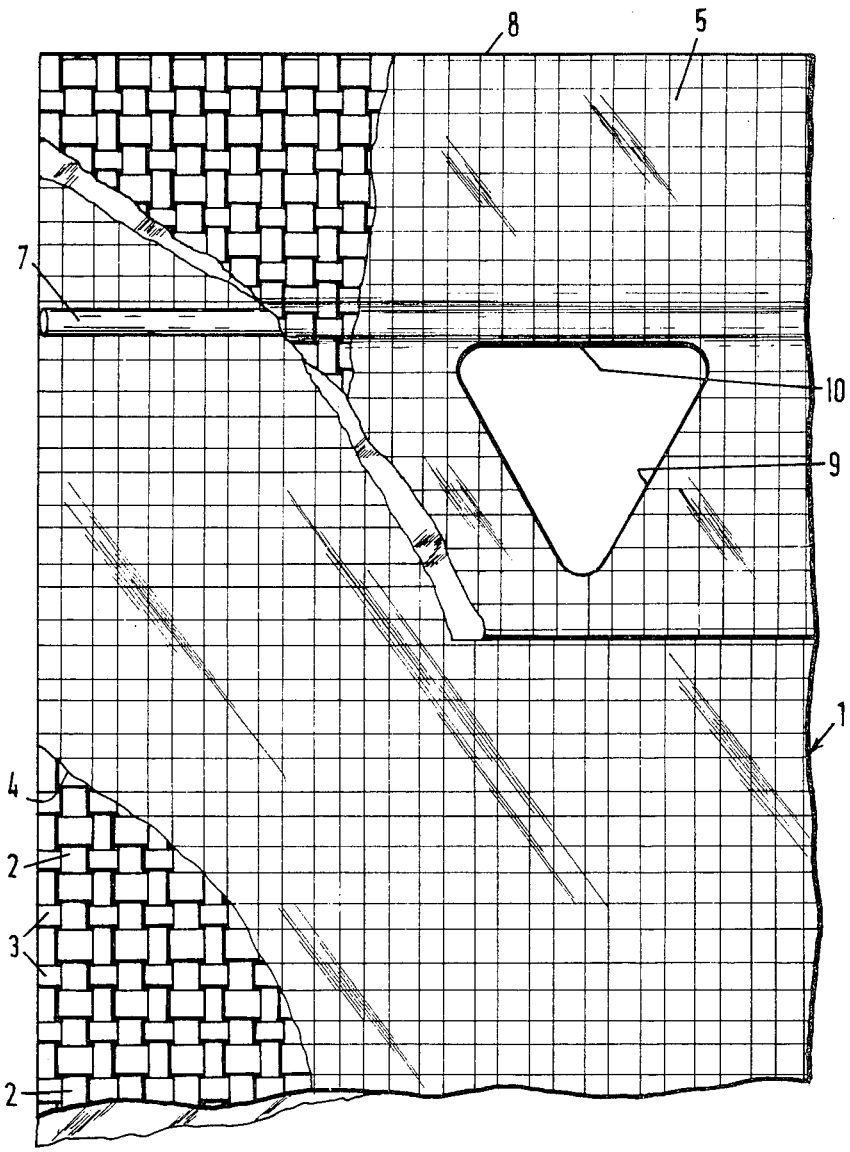
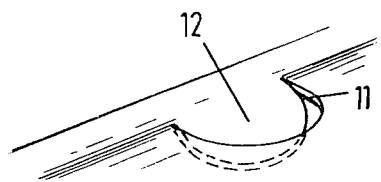
FIG. 1
FIG. 2

COVER WITH REINFORCED EDGE

For protecting goods against weather influences, covers or tarpaulins are utilized. Normally these are made of canvas or another suitable fabric that is moisture-proof or has been made moisture-proof. The edges are bordered and stitched, whereafter holes were made in the then double edge for mounting rings which serve for passing a cord by means of which the cover can be fastened.

However canvas is an expensive and heavy material which cannot be easily handled, which naturally has an impact on the manufacturing process, consequently the cost price.

To eliminate this drawback use was made of synthetic material, in particular a fabric from strips of stretched material. The fabric is provided at least on one side with a thin plastics layer.

Here too, the edges were bordered, possibly with an inserted cord at the place where the edge is folded over. The drawback however is that the stitching seam perforates the product and gives rise to tearing.

The cover according to the present invention comprises a fabric of plastics provided at least at one side with a covering foil likewise of plastics. Such a fabric has a width of about 2 m. However a larger width is required for a cover, which is obtained by adhering to each other some webs, in upset or slightly overlapping relationship.

The edges are not bordered but provided with narrow strips attached to the cover, possibly from the same material as the starting material.

In the reinforced edge portion holes are provided at some distance from the side boundary for attachment of the cover.

According to the present invention a substantial reinforcement of the edge strips is obtained in that prior to application of the edge-reinforcing strip a cord or the like is applied parallel to the lateral boundary and is embedded between the cover and said strip, whereby the attachment holes are formed in the region inwardly bounding the said reinforcement cord throughout edge strip and cover. Said cord preferably extends about lengthwise the centre of the reinforcement strip. During the application of the attachment holes it is ensured that the outer boundary of said holes terminates precisely within the cord.

Instead of round holes it is possible to apply half-round or angular holes in the reinforced edge region, whereby preferably the straight or one of the sides runs parallel to the cord and the lateral boundary of the cover.

Effectively each attachment hole is formed by a punching or cutting line extending through the respective edge strip and the edge region of the cover, the contour of which having an interruption in the region bounding the reinforcement cord such that there is formed adjacent said reinforcement cord, a pivoting flap having about the size of the hole.

Preferably the region of interruption of the contour of the punching of cutting line extends straight and parallel to the reinforcement cord.

The invention will now be described, by way of example, with reference to the accompanying drawing, wherein FIG. 1 is a perspective view of a part of a cover according to the invention, the covering foil being partly removed, and FIG. 2 is a perspective view of a detail.

The cover as a whole is indicated by 1, comprising a woven fabric of synthetic material, in particular narrow tape, of which the warp is indicated by 2 and the weft by 3. On either side of the fabric there may be disposed a cover foil, the topmost being indicated by 4.

As already observed, the cover having e.g. a width of about 6 m, is composed of fabric webs having a width of about 2 m. These webs are attached to each other either butted or overlapping each other e.g. 2 cm. This may be done thermally, e.g. by heating with hot air of about 300°–400° C., thus obtaining a welding temperature of 125°–130° C., necessary to apply for instance polyethylene at welding temperature.

At least at two parallel sides of the fabric there are applied reinforcement strips 5, which strips have an approximate width of 4–5 cm and are composed for instance of the same material as the cover. The attachment may then also take place by supply of heated air.

Before adhering the reinforcement strip 5 to the fabric 1, a reinforcement cord 7 may be embedded between strip and fabric; this cord as well consists for instance of plastics.

The cord 7 extends approximately lengthwise the centre of strip 5 parallel to the lateral boundary 8 of the fabric 1.

In the reinforced edge holes are made for passing rope for attachment of the cover. Preferably the holes are made angular. The drawing shows a triangular hole 9, the base 10 of which lies within the cord 7 and extending parallelly to said cord, respectively the lateral boundary 8. When forming the holes 9 it should be ensured that the cord 7 is not cut.

As shown in FIG. 2 the hole may also be formed by a non-closed notch. The drawing shows a notch having the shape of an arc 11. The portion of the material consisting of cover and edge strip, adjoining the cord 7, is not incised and forms a lip 12. Said lip provides an additional reinforcement while protecting the cord against the chafing effect of the attachment cord of the cover.

I claim:

1. A cover means which comprises a woven fabric web composed of a plurality of independent stretched strips of plastic material; a covering composed of a sheet of plastic material foil bonded to at least one side of said woven fabric web; separate reinforcing strips of plastic material bonded to one face of said cover at opposite edges thereof; attachment holes through said reinforcing strips, said foil and said web at intervals along said opposite edges of said cover; and means for reinforcing said cover against forces exerted thereon by attachment means extended through said attachment holes, said reinforcing means comprising elongate cords embedded over essentially their entire length and being fixed to and located entirely between said web or foil and said reinforcing strips adjacent the edges of the web, said cords paralleling said edges in abutting relationship to the attachment holes on the sides of said holes nearest the edges of the cover.

2. A cover according to claim 1, characterized in that the attachment holes have a semi-circular or angular shape and at least one straight side adjoining and substantially parallel to the reinforcement cords.

3. A cover according to claims 1 or 2 together with means for protecting said cord against chafing by attachment means extending through said holes, said protecting means comprising flaps composed of portions of said web and said covering, a flap as aforesaid being hinged in each of selected ones of said attachment holes on, and spanning, the side thereof abutted by the reinforcement cord associated therewith.

* * * * *